United States Patent
Kumar

(10) Patent No.: US 12,485,796 B2
(45) Date of Patent: Dec. 2, 2025

(54) VEHICLE ELECTRIC SUPPLY SYSTEM

(71) Applicant: Transportation IP Holdings, LLC, Norwalk, CT (US)

(72) Inventor: Ajith Kuttannair Kumar, Erie, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 574 days.

(21) Appl. No.: 16/272,777

(22) Filed: Feb. 11, 2019

(65) Prior Publication Data
US 2020/0254900 A1    Aug. 13, 2020

(51) Int. Cl.

| | |
|---|---|
| B60L 58/18 | (2019.01) |
| B60L 9/00 | (2019.01) |
| B60L 15/20 | (2006.01) |
| B60L 15/38 | (2006.01) |
| B60L 50/60 | (2019.01) |
| B60R 16/033 | (2006.01) |
| H02P 5/74 | (2006.01) |
| H02P 23/14 | (2006.01) |

(52) U.S. Cl.
CPC ........... B60L 58/18 (2019.02); B60L 9/00 (2013.01); B60L 15/20 (2013.01); B60L 15/38 (2013.01); B60L 50/66 (2019.02); B60R 16/033 (2013.01); H02P 5/74 (2013.01); H02P 23/14 (2013.01); B60L 2200/10 (2013.01); B60L 2200/26 (2013.01); B60L 2200/32 (2013.01); B60L 2200/36 (2013.01); B60L 2200/40 (2013.01)

(58) Field of Classification Search
CPC .... B60L 58/18; B60L 9/00; H02P 5/74; H02P 23/14
USPC ............................................................ 318/3
See application file for complete search history.

(56) References Cited

U.S. PATENT DOCUMENTS

| | | | |
|---|---|---|---|
| 3,904,947 A | 9/1975 | Crews | |
| 5,343,970 A | 9/1994 | Severinsky | |
| 5,545,967 A | 8/1996 | Osborne et al. | |
| 5,760,569 A | 6/1998 | Chase, Jr. | |
| 6,023,137 A * | 2/2000 | Kumar | F01M 5/025 318/400.27 |
| 6,209,672 B1 | 4/2001 | Severinsky | |
| 6,338,391 B1 | 1/2002 | Severinsky | |
| 6,554,088 B2 | 4/2003 | Severinsky | |
| 6,737,822 B2 | 5/2004 | King | |
| 7,859,202 B2 * | 12/2010 | Lukic | B60L 58/13 318/139 |

(Continued)

OTHER PUBLICATIONS

Non-Final Office Action received for related U.S. Appl. No. 16/272,820 mailed May 15, 2020 (10 pages).

*Primary Examiner* — Kawing Chan
(74) *Attorney, Agent, or Firm* — K&L Gates LLP

(57) ABSTRACT

An electric supply system for a vehicle that includes two or more energy storage devices configured to store electric energy is provided. Two or more buses are also provided, and each bus conductively couples an energy storage device of the two or more energy storage devices with a different motor of a plurality of motors of the vehicle. A controller is configured to control conduction of electric current from each of the battery assemblies to each of the motors of the vehicle, the controller is also configured to direct each of the battery assemblies to concurrently vary an input to each of the corresponding motors of the vehicle.

19 Claims, 7 Drawing Sheets

(56) References Cited

U.S. PATENT DOCUMENTS

| | | | | |
|---|---|---|---|---|
| 9,545,854 B2* | 1/2017 | Daum | | B60L 53/50 |
| 9,780,702 B2* | 10/2017 | Li | | H02P 5/74 |
| 10,270,265 B2* | 4/2019 | Owen | | B60L 3/0046 |
| 10,618,531 B2 | 4/2020 | Deshpande | | |
| 2002/0093299 A1* | 7/2002 | Kobayashi | | H02P 5/68 |
| | | | | 318/34 |
| 2006/0076171 A1* | 4/2006 | Donnelly | | B60L 15/38 |
| | | | | 180/65.225 |
| 2008/0277175 A1* | 11/2008 | Tyler | | B60L 58/33 |
| | | | | 320/101 |
| 2010/0133025 A1* | 6/2010 | Flett | | B60K 6/42 |
| | | | | 180/65.22 |
| 2010/0275810 A1* | 11/2010 | Barbee | | B60L 7/24 |
| | | | | 105/50 |
| 2011/0060486 A1* | 3/2011 | Meltser | | B61L 3/006 |
| | | | | 701/19 |
| 2011/0148353 A1* | 6/2011 | King | | B60L 50/30 |
| | | | | 320/109 |
| 2012/0038215 A1* | 2/2012 | Berry | | B60L 58/18 |
| | | | | 307/77 |
| 2012/0256568 A1* | 10/2012 | Lee | | H02J 7/1423 |
| | | | | 318/139 |
| 2013/0054069 A1* | 2/2013 | Komiya | | B60L 1/003 |
| | | | | 701/22 |
| 2013/0144476 A1* | 6/2013 | Pinto | | B60T 8/17555 |
| | | | | 701/22 |
| 2013/0167752 A1* | 7/2013 | Barbee | | B61C 3/02 |
| | | | | 105/1.4 |
| 2014/0167654 A1* | 6/2014 | Brockerhoff | | H02P 25/18 |
| | | | | 318/139 |
| 2014/0200756 A1* | 7/2014 | Sisk | | B60L 11/1864 |
| | | | | 701/22 |
| 2014/0277860 A1* | 9/2014 | Pulliam | | B60L 1/003 |
| | | | | 701/19 |
| 2014/0277862 A1* | 9/2014 | Pritchard | | B61L 15/0081 |
| | | | | 701/19 |
| 2016/0001664 A1* | 1/2016 | Roth | | B60L 53/14 |
| | | | | 318/139 |
| 2016/0052396 A1* | 2/2016 | Tsuchiya | | B60L 3/0046 |
| | | | | 318/139 |
| 2016/0082858 A1* | 3/2016 | Yang | | B60L 58/22 |
| | | | | 318/139 |
| 2016/0090107 A1* | 3/2016 | Deshpande | | B60R 25/045 |
| | | | | 701/82 |
| 2016/0114692 A1* | 4/2016 | Tripathi | | B60L 58/13 |
| | | | | 320/109 |
| 2016/0185237 A1* | 6/2016 | Ha | | B60L 50/51 |
| | | | | 318/139 |
| 2016/0244176 A1* | 8/2016 | Xiao | | H02P 3/14 |
| 2017/0120772 A1* | 5/2017 | Alser | | H02P 27/06 |
| 2017/0300439 A1* | 10/2017 | Paryani | | G06F 11/07 |
| 2018/0009331 A1* | 1/2018 | Huang | | H01M 10/482 |
| 2019/0185025 A1* | 6/2019 | Kumar | | B60L 3/0092 |
| 2019/0310317 A1* | 10/2019 | Elend | | G01R 31/31703 |
| 2020/0091853 A1* | 3/2020 | Yoshida | | H02P 5/74 |

* cited by examiner

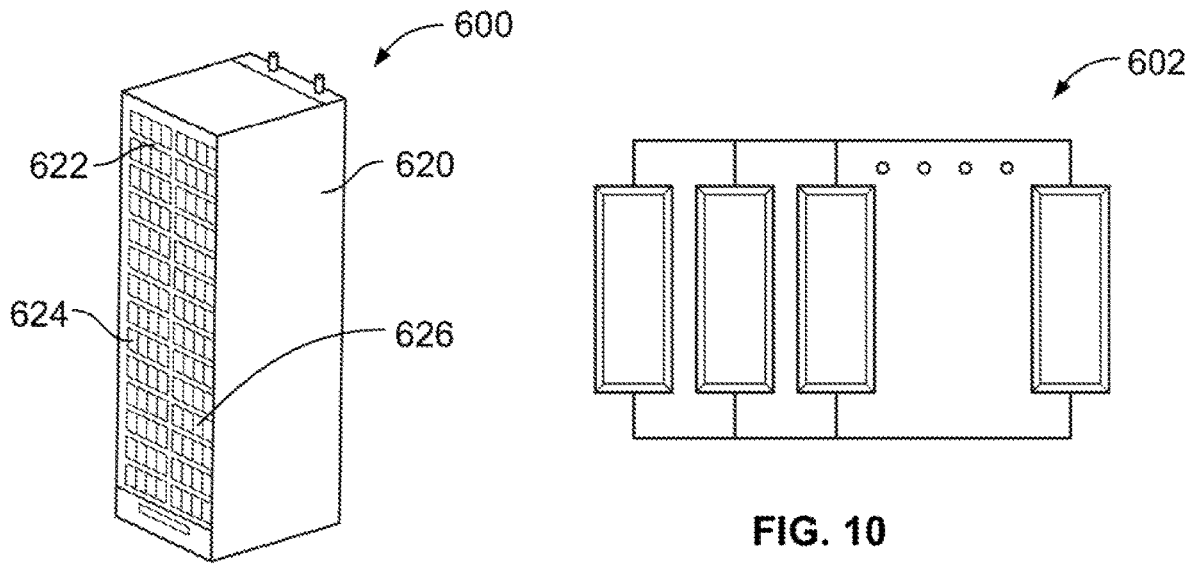
FIG. 9
FIG. 10
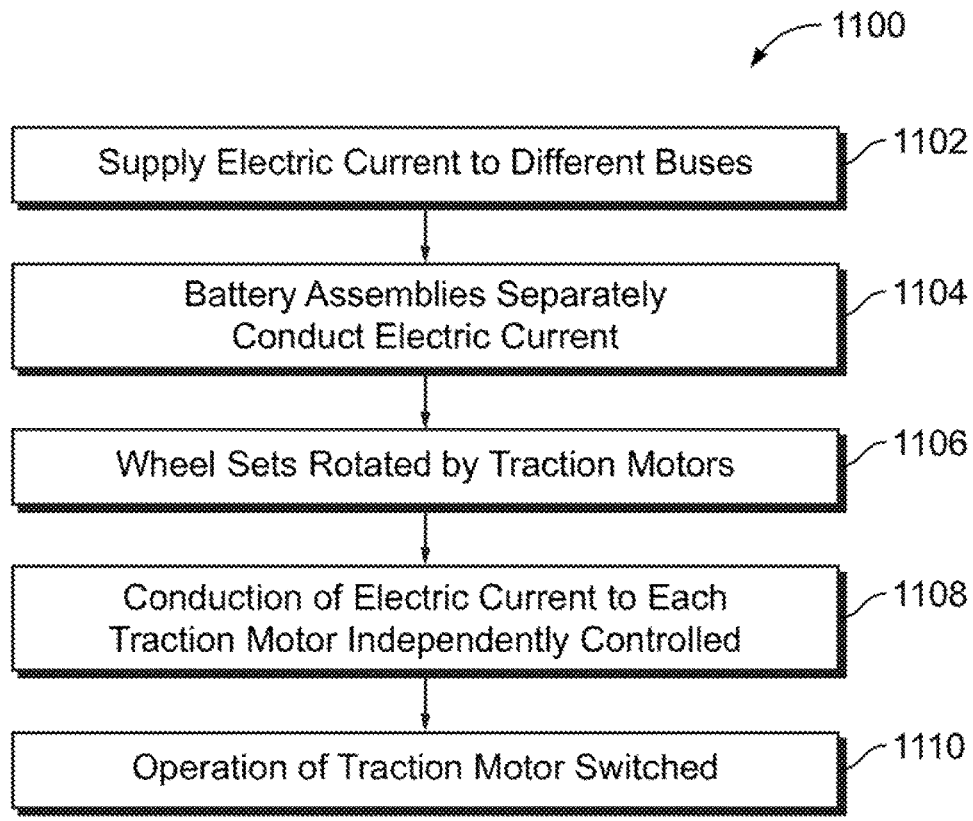
**FIG. 11

VEHICLE ELECTRIC SUPPLY SYSTEM

BACKGROUND

Technical Field

The inventive subject matter described herein relates to an electric supply system for a vehicle system.

Discussion of Art

Some vehicle systems, such as rail vehicles, marine vessels, mining equipment, and over-the-road trucks, have used diesel engines to provide propulsion power. These propulsion systems may provide direct mechanical power or may convert the engine torque to electrical energy to drive traction motors (including drive motors). As technologies advance, some diesel engines may be replaced with electric supply systems that include numerous battery assemblies to supply some or all of requisite propulsion power.

Electric supply systems that utilize a large number of battery cells can be difficult to maintain and cumbersome to operate. Performance issues with one battery assembly may cause performance issues with the entire vehicle system. Additionally, different electrical systems within a vehicle system have differing power requirements but large format batteries may inefficiently supply such disparate power needs. It may be desirable to have a system and method that differs from those that may be currently available.

BRIEF DESCRIPTION

In one example of the inventive subject matter described herein, an electric supply system for a vehicle that includes two or more energy storage devices configured to store electric energy is provided. Two or more buses are also provided, and each bus conductively couples an energy storage device of the two or more energy storage devices with a different motor of a plurality of motors of the vehicle. A controller is configured to control conduction of electric current from each of the battery assemblies to each of the motors of the vehicle, the controller is also configured to direct each of the battery assemblies to concurrently vary an input to each of the corresponding motors of the vehicle.

In another example of the inventive subject matter described herein a vehicle electric supply system includes a plurality of power supply assemblies. Each of the power supply assemblies includes a battery assembly including rechargeable energy storage devices, an inverter coupled to the battery assembly, a motor coupled to the inverter, and a bus conductively coupled with the battery assembly and inverter. The battery assembly of each power supply assembly is configured to power a corresponding motor of each power supply assembly with electric current supplied by the battery assembly via a corresponding bus of each power supply assembly.

In another example of the inventive subject matter described herein, a method for powering a vehicle includes directing a battery assembly of two or more power supply assemblies to supply electric current to a different bus of two or more buses of the power supply assemblies, conducting the electric current from the battery assemblies via the corresponding buses of the power supply assemblies to a different traction motor of plural traction motors of the vehicle, and rotating wheel sets of the vehicle using the traction motors that receive the electric current from the corresponding battery assembly via the corresponding bus.

BRIEF DESCRIPTION OF THE DRAWINGS

Reference may be now made briefly to the accompanying drawings, in which:

FIG. 9 may be a schematic diagram of a battery assembly in accordance with one embodiment of the inventive subject matter;

FIG. 10 may be a schematic diagram of a battery assembly in accordance with one embodiment of the inventive subject matter;

FIG. 11 may be a flow block diagram of a method of powering a vehicle in accordance with one embodiment of the inventive subject matter.

DETAILED DESCRIPTION

Figure 1:
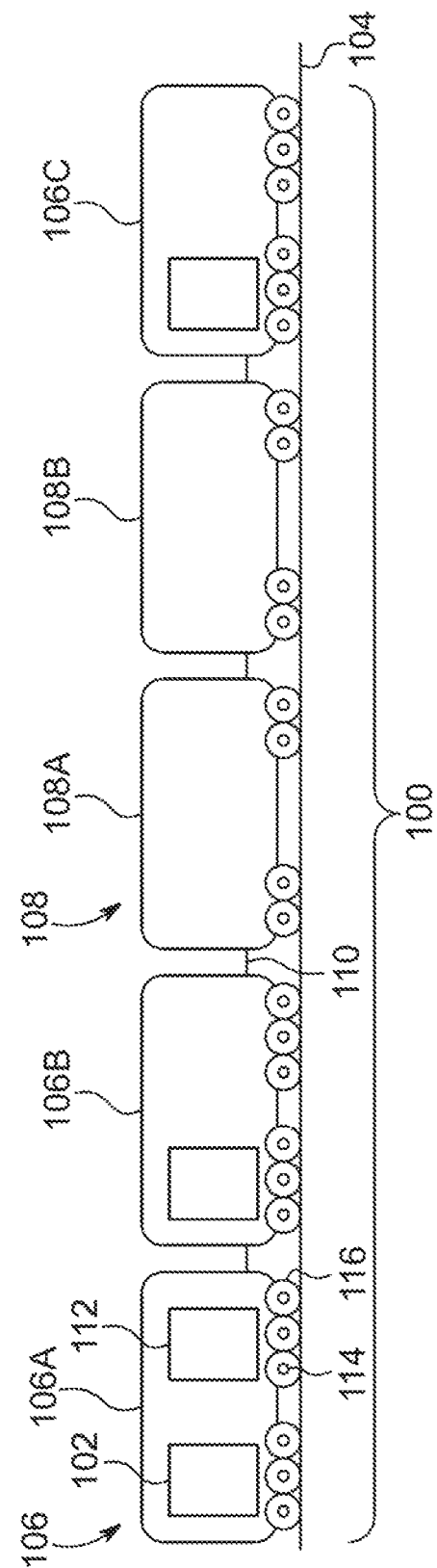
FIG. 1 may be a schematic diagram of a vehicle system in accordance with one embodiment of the inventive subject matter.

One or more embodiments described herein provide systems and methods for powering vehicle assemblies with power supply assemblies, with each power supply assembly controlled and operated by a common controller. The devices that are powered are described herein are motors and can include traction motors, auxiliary motors that are powered to perform work other than propulsion, other devices, or the like. Separate buses conductively couple a battery assembly of a power supply assembly to one or more motors within the power supply assembly. The battery assemblies may each include one or more energy storage devices and one or more buses that conduct current from the energy storage devices to one or more motors. Each battery assembly may separately power a different motor or set of motors than the other battery assemblies. For example, a first battery assembly may include one or more first batteries and a first bus that conductively couples (and conducts current from) the first batteries to a first motor (or first set of motors). A second battery assembly of the same vehicle may include one or more second batteries and a second bus that conductively couples (and conducts current from) the second batteries to a second motor (or second set of motors). The system may include several more battery assemblies. Optionally, the buses of two or more battery assemblies may be capable of being coupled with each other (e.g., by a switch) so that the batteries of one power supply assembly can switch to a mode where the batteries supply current to the batteries of another power supply in the event of an issue with one or more battery assemblies, or to provide onboard charging of battery assemblies.

Each battery assembly may be controlled individually by providing separate individual buses to provide an individual electric current path between a battery assembly and a corresponding motor through an individual bus. A controller can then control conduction of each electric current path concurrently to supply varying amounts of the electric current to the different motors of the vehicle system. Specifically, because the controller operates, or controls each bus and each bus provides the electric current path between a corresponding battery assembly and motor, the controller can vary the conduction of electric current as desired based on system requirements. This includes only actuating the number of axles needed to power the vehicle (e.g. train) during times of lower power requirements increasing efficiencies of the motors. In particular, as power requirements increase, an additional motor may be added to keep efficiencies high while meeting power requirements to propel the vehicle.

Additionally, by providing this system architecture, handling of reduced performance currents may be facilitated, because each bus operates as a separate circuit that may not be dependent on another battery assembly, bus, or motor. Consequently, reduced performance currents that may result from shorting, overheating, wheel slippage, inefficient components, or the like, may be isolated, facilitating identification and replacement, and repair. The system architecture also provides the ability to have different string configurations associated with or coupled to different buses. This allows for portions of the system to be modified as needed. Thus, each axle could have an electric supply system with different chemistry, charging/discharging requirements, make/model, manufacturer, voltage, capacity, thermal management system, and the like to optimize each circuit or system individually. Furthermore, the system provides a reduced risk of strings, or sections, of batteries being at a different state of health, charge, control, and the like. The system thus allows for packaging into a building block with everything needed for a vehicle component or system, such as an axle, traction drive, cooling/heating system, or the like already incorporated. This gives manufacturing, testing and repairing flexibility.

Figure 2:
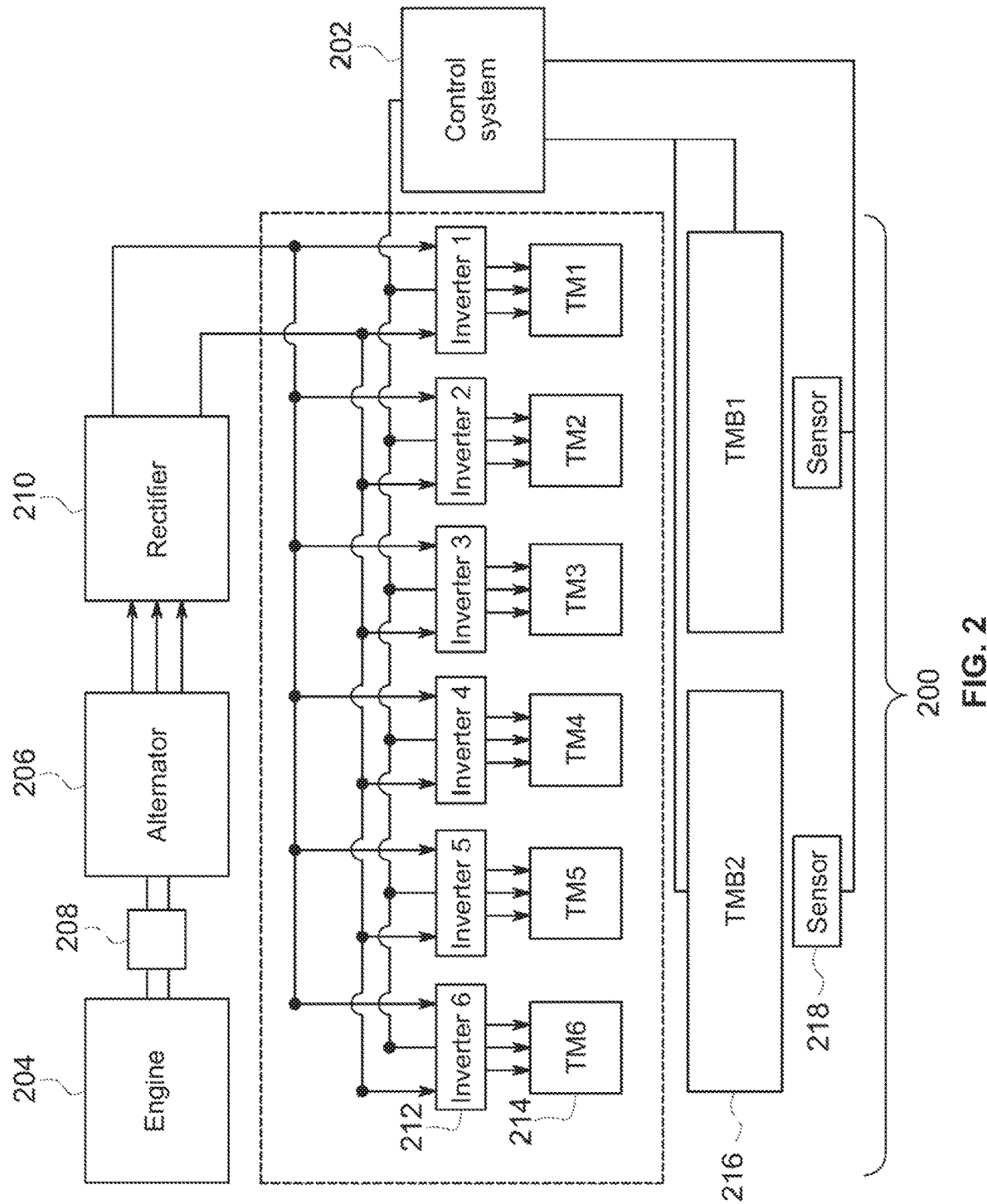
FIG. 2 may be a circuit diagram of a propulsion system in accordance with one embodiment of the inventive subject matter.

FIG. 1 is a schematic diagram of a vehicle system 100 having a traction control system 102 according to one embodiment. The method 200 of powering a vehicle illustrated in FIG. 2 may be performed by one or more embodiments of the traction control system 102. FIG. 1 and FIG. 2 illustrate example embodiments that in one example are illustrated in U.S. Ser. No. 16/163,225, filed Oct. 17, 2018, entitled Vehicle Traction Control System and Method to Sharath et al. that is incorporated in full herein. The vehicle system represents a vehicle consist, such as a rail vehicle consist, having propulsion-generating vehicles 106 (e.g., vehicles 106A-C) and non-propulsion-generating vehicles 108 (e.g., vehicles 108A-B) mechanically coupled together by couplers 110 while the vehicle system moves along a route 104. While the description herein focuses on the vehicle system being a rail vehicle consist having locomotives as the vehicles and railcars as the vehicles 108 (e.g., a train), alternatively, one or more embodiments described herein may be applied to other types of vehicle consists and/or vehicles, such as other off-highway vehicles (e.g., mining vehicles or other vehicles that may be not designed or legally permitted for travel on public roadways), marine vessels, automobiles, trucks, aircraft, or the like. Additionally, the vehicle system may be formed from a single vehicle instead of multiple vehicles. Optionally, in a vehicle system formed from several vehicles, the vehicles may be separate from each other but logically coupled with each other in that the vehicles communicate with each other to coordinate their movements with each other (so that the separate vehicles move together as a larger vehicle system, or convoy, along the routes).

The vehicles include propulsion systems 112 having traction motors (shown and described below) operably coupled with axles 114 and/or wheels 116 of the vehicles. The traction motors may be connected with the axles and/or wheels via one or more gears, gear sets, or other mechanical devices to transform rotary motion generated by the traction motors into rotation of the axles and/or wheels to propel the vehicles and, consequently, the vehicle system. Different traction motors may be operably connected with different axles and/or wheels such that traction motors that may be deactivated (e.g., turned off) do not rotate corresponding axles and/or wheels while traction motors that remain activated (e.g., turned on) rotate corresponding axles and/or wheels.

FIG. 2 illustrates a circuit diagram of a traditional propulsion system 200 and a traction control system 202. In one example the propulsion system may utilize a diesel engine. The propulsion system may include one or more engines 204 that may be operably connected with an alternator or generator 206 ("Alternator" in FIG. 2) by one or more transmission members 208 (e.g., shafts and/or gears, or the like). The engine rotates the shaft or other transmission member 208 to cause the alternator or generator 206 to generate electric current. This electric current may be supplied to a rectifier 210, which then supplies the current to several inverters 212 ("Inverter 1 ," "Inverter 2," "Inverter 3," "Inverter 4," "Inverter 5," and "Inverter 6" in FIG. 2). The inverters 212 may be connected with different traction motors 214 ("TM1," TM2," "TM3," "TM4," "TM5," and "TM6" in FIG. 2) in the illustrated embodiment. The inverters also may be operably connected with the control system. The control system can control which traction motors may be activated or deactivated, the level of power they receive, the torque they may generate, the phase width modulation of the current, the thermal output of the traction motor, the overall voltage applied to the traction motor, and even the phase and cycle rate of the current supplied to the traction motor. Additionally, the control system may control other aspects of the operating state of the traction motors via control signals that may be communicated to the inverters. For example, the control system can communicate different control signals to different inverters via one or more wired and/or wireless connections to individually control (a) which ones of the inverters activate the corresponding traction motors, (b) which inverters deactivate corresponding traction motors, (c) the current supplied from the inverters to the corresponding traction motors (e.g., to control the power outputs from the traction motors), and the like. Of note, that while the term traction motor is used herein, it includes other motors—such as a motor that provides torque to, for example, a drive shaft of a marine vessel or a rotor on an aircraft.

One or more traction motor blowers 216 ("TMB1" and "TMB2" in FIG. 2) represent fans that move air toward the traction motors in order to cool the traction motors. One traction motor blower may cool several traction motors in one embodiment. The speeds at which the traction motor blowers operate may be controlled via control signals communicated from the control system to the traction motor blowers. Several temperature sensors 218 sense or measure the operating temperatures of the traction motors and generate data representative of the operating temperatures of the traction motors. This data can be communicated to the control system. As described above, the control system can at least partially base the selection of which traction motors to turn on or off based on the operating temperatures of the traction motors.

As described above, the control system can deactivate one or more traction motors and/or change the operating state of traction motors so that the combined power output of the activated traction motors meets or exceeds the tractive load demanded by the vehicle system. Doing so can increase the efficiency of the propulsion system relative to propelling the vehicle system with a larger number of activated traction motors.

Figure 3:
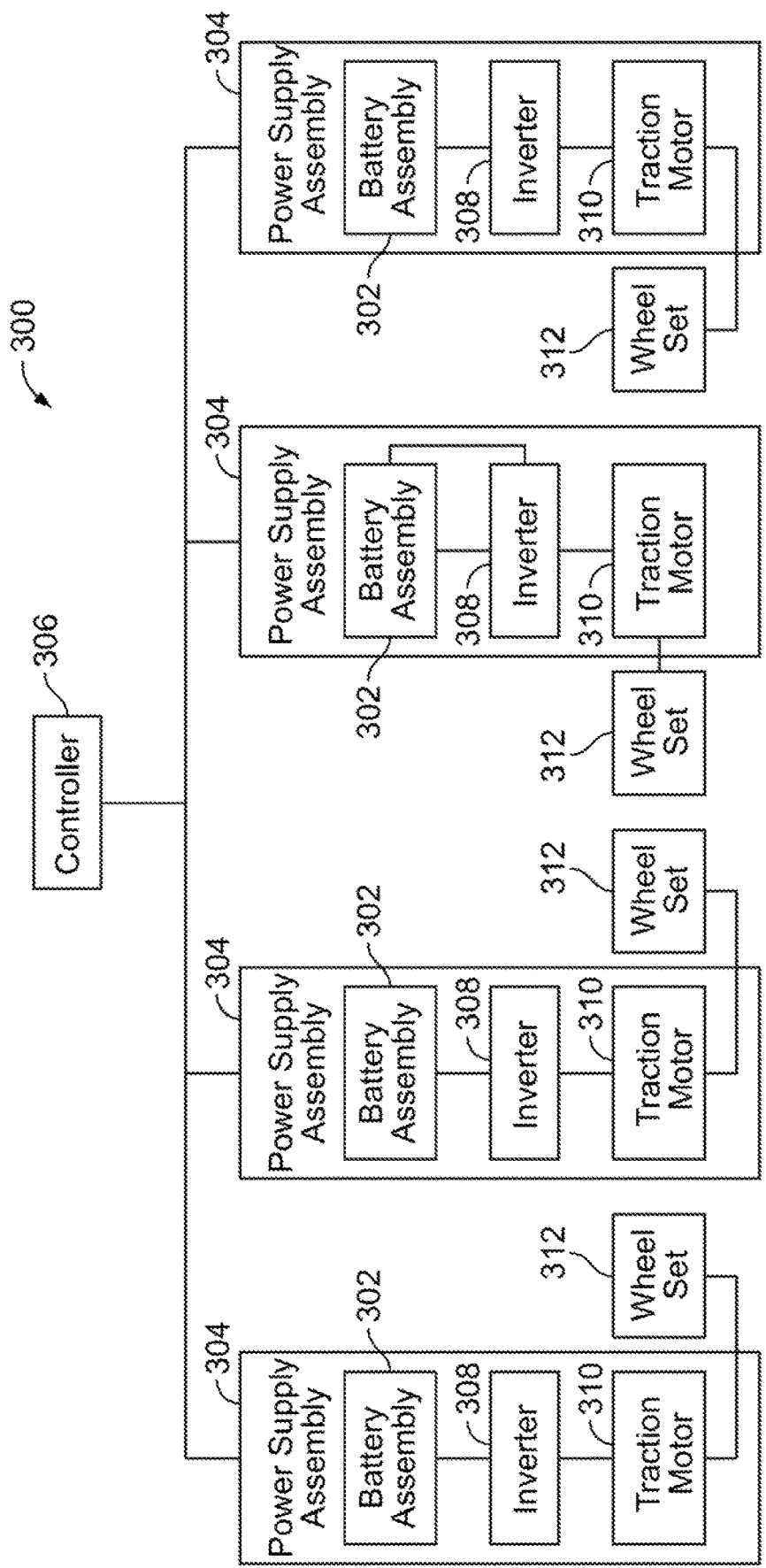
FIG. 3 may be a schematic diagram of a vehicle system in accordance with one embodiment of the inventive subject matter.
Figure 4:
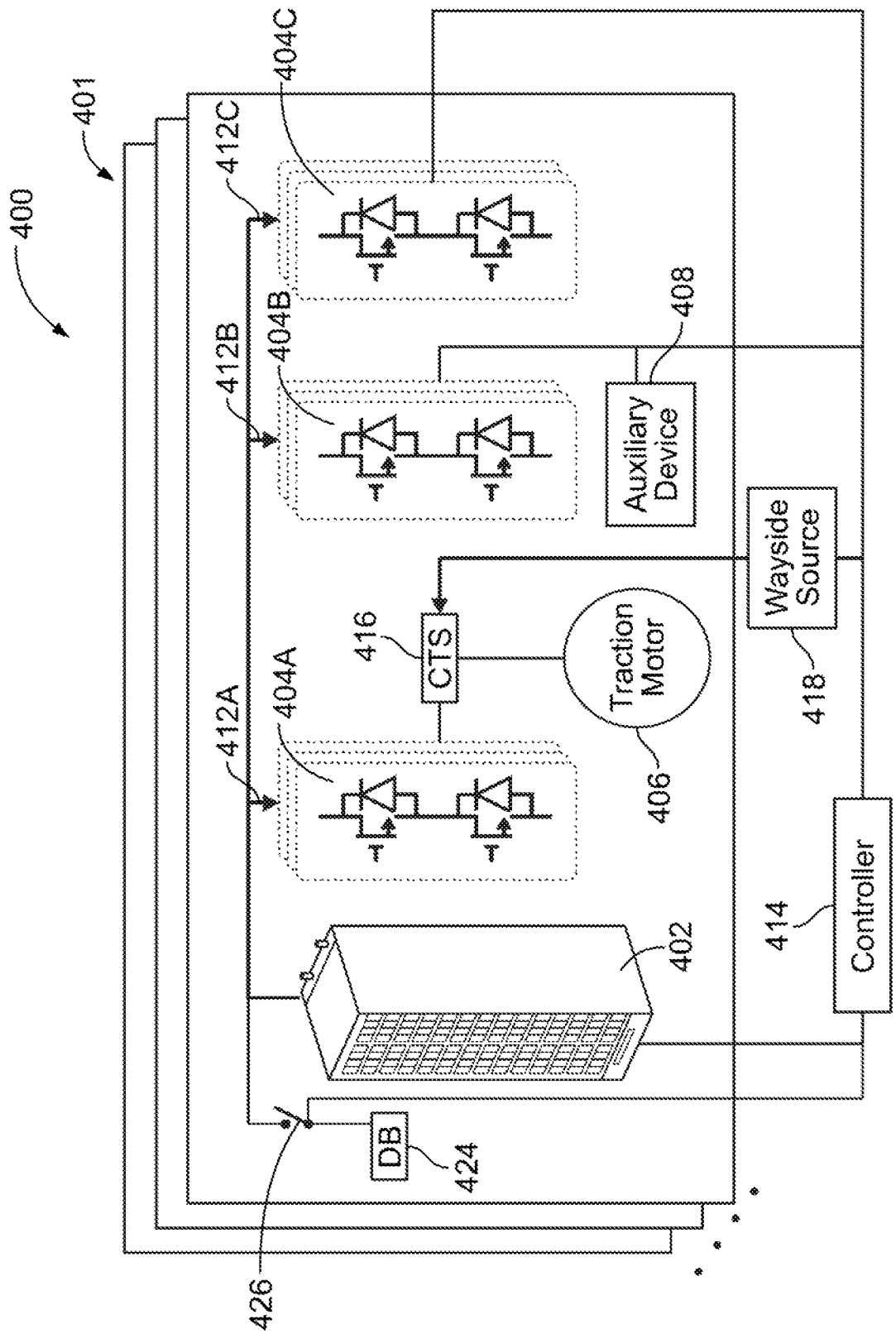
FIG. 4 may be a schematic diagram of an electric supply system in accordance with one embodiment of the inventive subject matter.

In retrofitting a diesel powered locomotive to a purely battery powered locomotive (or other vehicles), the diesel engine, alternator or generator, shafts, and rectifiers of this propulsion system may be replaced with an energy storage device. Suitable energy storage devices include, for example, a set of batteries, a fuel cell, and the like. For convenience, energy storage devices may be referred to as battery systems and sets of batteries throughout. FIGS. 3-4 illustrate system architecture for implementing the set of batteries in a manner that results in increased motor efficiencies, enhanced maintenance, and system protection among other advantages.

FIG. 3 illustrates a schematic diagram of a vehicle electric supply system 300, or energy system, that separates the set of batteries into separate battery assemblies 302 that each power an individual power supply assembly 304. As illustrated in FIG. 3, each power supply assembly may be physically and electrically separate from the other power supply assemblies. Instead, each power supply assembly may be operatively coupled to a controller 306 that controls each of the power supply assemblies such that different power supply assemblies may have different inputs and/or outputs as required during operation of the vehicle to enhance vehicle performance. In this manner, the battery assemblies may be varied as may be required for an individual power supply assembly.

As an example, as may be described in greater detail in relation to FIG. 10, the battery assembly may include many strings of batteries. The number of strings may be selected based on power requirements within a power supply assembly. As an example, additional strings may be added to the battery assembly of a first power supply assembly that powers both a traction motor and an auxiliary motor as compared to a second power assembly that powers only a traction motor. In this manner the number of strings, the number of battery cells, the types of batteries, the configuration of the battery assembly, or the like may be selected based on the individual operational requirements of the given power supply assembly. Additionally, the controller may determine the manner in which a commanded desired load on the locomotive may be distributed between the power supply assemblies. Thus, in one example, the controller may only actuate a single power supply assembly to provide propulsion for the vehicle. Alternatively, more than one power supply assembly may be powered, but less than all of the power supply assemblies to increase efficiencies of operation. While illustrated in FIG. 3 with four separate power supply assemblies, this may be for example purposes only. In other examples, more power supply assemblies may be included in the vehicle electric supply system 300, including at least eight power supply assemblies in one example.

Each power supply assembly includes at least a battery assembly 302, an inverter 308, a motor 310, and a wheel set 312. Optionally, a power supply assembly may include more than one traction motor, auxiliary motors, or the like as will be described in more detail in relation to FIG. 4. By isolating the power supply assemblies from one another, when decreased performance in one battery assembly, inverter, traction motor, wheel set, or the like occurs, the controller may be able to power the other power supply assemblies to continue operation of the vehicle without complete shutdown. Similarly, each individual power supply assembly may be maintained, charged, repaired, and the like depending upon power usage within the individual power supply assembly. Therefore, the controller may determine when a battery assembly 302 of one power supply assembly has low or reduced charge or power, and thus does not operate that power supply assembly until maximum power may be needed for the locomotive. Alternatively, the controller may determine that a power supply assembly will be charged at an upcoming stop and thus prioritize using that power supply assembly to utilize as much power as possible in the power supply assembly before charging. Alternatively, the controller may prioritize a power supply assembly to another function that may include an auxiliary motor that powers an auxiliary system of the vehicle or some other electrical system. In one example the vehicle may be a locomotive and the auxiliary motor operates the heating and air-conditioning of the locomotive. In another example, the vehicle is an on-road passenger vehicle and the auxiliary system is a communication and navigation system. In either example, the controller maintains power within the power supply assembly to ensure that the auxiliary function remains available, even in a non-propel state.

FIG. 4 is a block diagram of a portion of a vehicle electric supply system 400. The vehicle electric supply system of FIG. 4 illustrates a power supply assembly 401 of a plural of power supply assemblies. In one example, the power supply assembly may be one of the power supply assemblies of FIG. 3. The power supply assembly includes an energy storage assembly 402, which includes one or more batteries, plural inverters 404A-C, a motor 406 that may be one of plural motors, auxiliary devices 408 that may include plural motors, plural buses 412A-C, and a controller 414 electrically coupled to the power supply assembly to control conduction of electric current from the battery assembly to the traction motor of the vehicle. Specifically, the controller may direct the battery assembly to conduct electric current as required to meet the propulsion, braking or hold demands of the vehicle.

Figure 5:
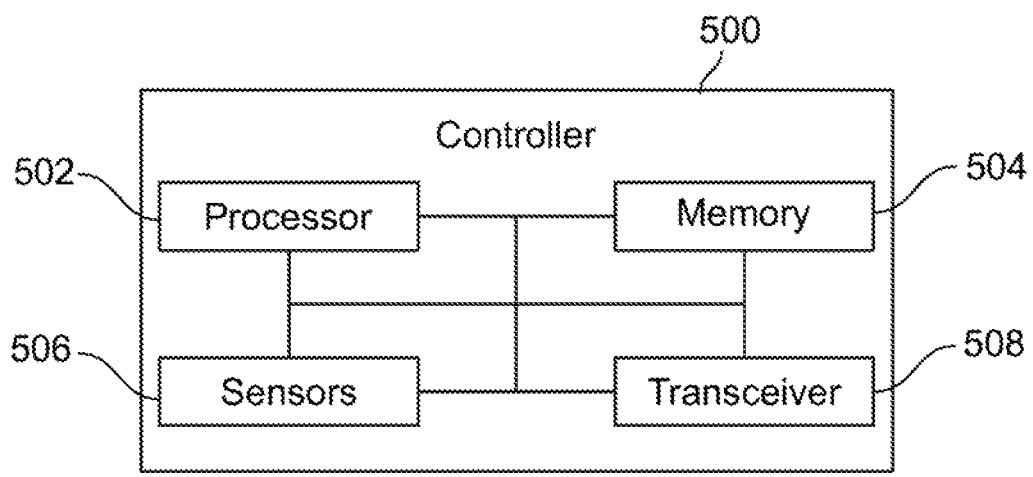
FIG. 5 may be a schematic diagram of a controller in accordance with one embodiment of the inventive subject matter.

A suitable energy storage system may include numerous battery cells that in one example may be assembled and coupled together as provided in relation to FIG. 5. Specifically, the battery cells may be grouped and coupled and disposed in individual battery assemblies that may be coupled and combine to form a battery system. In one example, the battery may be a large format lithium-ion battery. A suitable size and capability may be one that generates power in a range of from about 2 MWh to at least 10 MWh. A suitable battery may be formed with up to about 14,000 individual battery cells, in a range of from about 14,000 cells to about 70,000 individual battery cells, or greater than 70,000 cells depending on application specific needs and parameters. In one example the cells may be arranged in series+parallel combinations. Thus, numerous battery assemblies house these individual battery cells to provide power to a vehicle, such as the propulsion generating vehicle of FIG. 1. In one example, the battery assembly may be electrically coupled in a parallel arrangement to the inverters 404A-C via the buses 412A-C. Alternatively, the battery assembly may be coupled in series to inverters 404A-C via the buses 412A-C. Optionally, the battery assembly may be coupled in parallel to some components while in series to other components. In another example, more than one inverter 404A-C can be used with the battery assembly.

The motor in one example is a traction motor that powers the axle, and/or wheel set of a vehicle such as the axle and wheels of the propulsion generating vehicle of FIG. 1. Similarly, the traction motor may be one of plural traction motors and in one example may be operated and controlled by the controller.

The auxiliary device in one example includes auxiliary motors within the vehicle system. If the vehicle system may be a rail vehicle, such as a locomotive, switcher, shunter, rail car, or the like, then suitable auxiliary devices may be one or more of a smaller engine/generator set that generates electric current to control or operate a function of the vehicle. Optionally, such devices include propulsion control devices, axle control devices, wheel control devices, operational devices such as heating or cooling devices, loading and unloading devices, power take offs, pumps, and the like. With regard to the motor and auxiliary device, numerous battery assemblies may be formed to provide conductive electric current for operation of separate motors. In one example the number of battery assemblies may be about the same or identical to the number of motors within the vehicle electric supply system.

The plural buses 412A-C provide a link or pathway for conductive electric current between the battery assembly and corresponding traction motor or auxiliary device. By electrically coupling the battery assembly to each bus 412A-C for controlling the conductive electric current to a traction motor, auxiliary device, and other vehicle systems, the battery assembly couples to each of the traction motor, the auxiliary device, and other vehicle system to form an isolated system, or circuit. Specifically, each power supply assembly is its own isolated system or circuit were to vary an output of a motor within the power supply assembly, the input from the battery may be varied, or alternatively, the conduction of the current along each of the plural buses may be varied.

Consequently, each such isolated system, or circuit, includes a battery assembly within the system or circuit, and may be able to be controlled by the controller such that each system or circuit may provide a different input and/or output or may distribute the conductive electric current differently among the systems or circuits to enhance efficiencies. Such inputs may include current, voltage, pulse width, cycle rate, frequency, or the like.

In one example, responsive to one wheel set of one power supply assembly slipping (e.g., which can occur when a wheel rotates at a speed that is faster than the speed at which the vehicle moves along the surface on which the wheel is moving), the controller can change an input and corresponding traction motor output of another power supply assembly in response to compensate for the slippage. This change can involve increasing or decreasing the power of the current supplied to the traction motor(s) coupled with the other power supply assembly, changing a phase of current supplied to the traction motor(s) coupled with the other power supply assembly, increasing or decreasing a voltage of current supplied to the traction motor(s) coupled with the other power supply assembly, changing a frequency of current supplied to the traction motor(s) coupled with the other power supply assembly, or the like. Thus, the inputs and outputs to each power supply assembly differ from one another to compensate for the wheel slippage.

Alternatively, in another example, responsive to a wheel set of a first power supply assembly experiencing slippage, the input to the second power supply assembly may remain the same, and the same as the first power supply assembly that powers the wheel set that is experiencing the slippage. Instead, the distribution of the conductive electric current through the separate buses within the second power supply assembly may vary to increase the output of the traction motor of the second power supply assembly in response to and to compensate for the slippage of the wheel set powered by the first power supply assembly. In this manner, the controller may selectively couple the buses to provide conductive electric current from the battery assembly to the traction motor(s), auxiliary device(s), and other vehicle systems to optimize vehicle electric supply system performance.

In yet another examples, other conditions may occur such as overheating of a traction motor associated with a first power supply assembly resulting in a decrease of input current for that first power supply assembly. In response, the controller may then change the input current of a second power supply assembly to provide more conductive electric current to a traction motor within the second power supply assembly to compensate for decrease in output of a traction motor of the first power supply assembly that results from the decrease in input current because of the overheating. Specifically, current supplied to the overheating motor is either reduced or stopped while current to another motor, or motors either remains constant, or alternatively increases to compensate for less output provided by the overheated motor.

In another example, shorting within a power supply assembly may result in variance of current from a first power supply assembly and in response, variance of a second power supply assembly to compensate for the variance in the first power supply assembly. Specifically, when shorting occurs in a first power supply assembly, the controller may detect such a short, and consequently reduce or stop the conduction of current from the battery assembly in that first power supply assembly to a traction motor, auxiliary motor, or the like in the first power supply assembly. In such an example, the controller may concurrently increase the conduction of current from a battery assembly to a traction motor in a second power supply assembly to compensate for a reduction in output of a motor in the first power supply assembly.

In yet another example, a first power supply assembly having greater efficiency than a second power supply assembly, may provide additional conditions in which the controller may vary the conductive electric current supplied by different battery assemblies in different power supply assemblies. Specifically, in one example, different efficiencies may create uneven torque, thus presenting a need to vary the electric current to compensate for the uneven torque. Alternatively, the controller may utilize a more efficient power supply assembly coupled to a first, front wheel set than a less efficient power supply assembly coupled to a second, back wheel set to increase efficiencies of the system. In one example, when not all the wheel sets are required to propel a vehicle, power to less efficient power supply assemblies may be ceased to allow only the most efficient power supply assemblies to provide propulsion power. When more power is desired, the most efficient power supply assembly not operating may then added to increase power for propulsion while keeping less efficient power supply assemblies off.

In other examples, operation of the vehicle may result in varying the input provided by each power supply assembly. For example, when a vehicle is making a turn, different loads may be experienced on wheels on the inside of the turn as compared to the outside of the turn. Thus, the input for each wheel is varied as the load requires for each power supply assembly. Thus, different power supply assemblies may provide different inputs to inside wheel motors as compared to outside wheel motors accordingly. Similarly, when a vehicle is starting or stopping, wheels, or wheel sets in the front of the vehicle may experience a different load requirement than then wheels, or wheel sets in the back of the vehicle. The controller may thus vary an input of power supplied to a wheel set at the front of the vehicle in a different manner than an input of power supplied to a wheel set at the back of the vehicle.

In another example, an auxiliary motor in a power supply assembly may provide an additional load in a specific power supply assembly requiring a variance in conduction of electric current in the power supply assembly. In such and example a first power supply assembly includes a first motor that receives a first input, while concurrently a second power supply assembly includes a second motor that receives a second input, and a third motor that receives a third input where the third motor may be an auxiliary motor that operates a heating and cooling system. Thus, when additional input power may be required for operating the heating and cooling system, the conduction of electric current from a battery assembly of the second power supply assembly may increase so that the demand for increased power to the third motor may be achieved while the second input on the second motor remains constant. Concurrently, the conduction of electric current of the first power supply assembly may remain unchanged.

Other examples that present differing load requirements on different motors of a vehicle or vehicle system may include vehicles with differing wheel sizes or diameters, tires with differing air pressure, including flat tire conditions, aircraft that must handle differing loads associated with take-off conditions, turbulence, icy runways, changes in wind, or the like, sudden braking or stops, increased load conditions on auxiliary motors for mining vehicles as a result of working conditions such as rock removal, current variances for marine vehicles, and/or the like. In each example, a vehicle or vehicle system includes numerous motors that have varying torque or load requirement based on operating conditions specific to that vehicle or vehicle system. Still, with the system architecture described herein, each power supply assembly may be operated at the same input, or differing inputs as desired to enhance efficiencies. In this manner, the system may efficiently compensation for operational conditions such as wheel slippage, overheating, shorting, efficiency differences, operational differences, torque requirements, load requirements, or the like. This increases system efficiencies while enhancing system performance compared to existing systems.

The controller can also communicate different control signals to the different inverters 404A-C via one or more wired and/or wireless connections to individually control which ones of the inverters 404A-C activate the corresponding traction motor, auxiliary device, other vehicle system, or the like, and which inverters 404A-C deactivate corresponding a traction motor, auxiliary device, or other vehicle system or the like to control the power outputs from the motor, auxiliary device, and other vehicle system. In one example, because the controller may be able to control the conductive electric current path between the battery assemblies and traction motors of different power supply assemblies 401, the effects of a decreased performance within the electric supply system may be mitigated. Specifically, if decreased performance occurs in a first power supply assembly, the controller may prevent operation of that first power supply assembly while allowing operation of the other power supply assemblies. In this manner, when four power supply assemblies may be provided, if a decreased performance occurs in one power supply assembly, the power supplied by the other three power supply assemblies may be increased to compensate for the decrease in performance.

Specifically, during operation, the controller may choose to cease operation of one power supply assembly, or alternatively greatly reduce the power supplied by the power supply system while increasing the amount of power supplied by another power supply system. In one example, a power supply assembly with more charge may be operated by the controller to supply more power than a power supply assembly having less charge. Alternatively, when a first power supply assembly includes a battery assembly that is fully charged to 100% of capacity and a second power supply assembly includes a battery assembly that is run down and only charged to 30% of capacity, the controller may close a switch to provide current from the fully charged battery assembly of the first power supply assembly to the run down battery assembly of the second power supply assembly to charge the run down battery assembly. In one example, the controller may temporarily increase the output of a third power supply assembly to a traction motor to propel a vehicle while stopping conduction of electric current in the first power supply assembly to a traction motor of the first power supply assembly so that the current may be redirected to charge the run down battery assembly of the second power supply assembly.

In yet another example, the battery assembly of a first power supply assembly may have a battery with chemistry that makes the battery assembly more efficient and superior to another battery assembly. As a result, the controller may determine to have the power supply assembly with the more efficient battery assembly supply more power than the other power supply assembly.

Similarly, for maintenance and performance purposes, measurements may be detected on both a local level and macro level. Specifically, each power supply assembly may be monitored to detect wear, efficient performance, load requirements, and the like. With regard to maintenance, the charge, age, mileage, efficiency, or the like may be monitored and/or determined during operation of the vehicle and the controller may reduce conduction of electric current for power supply assemblies that have a battery assembly that may be less efficient, has less charge, is older, or the like while increasing conduction of electric current for power supply assemblies that may be more efficient, have more charge, are newer, or the like. In another example, while in operation, a first power supply assembly with a battery assembly that is about to run out of charge may be charged by a battery assembly of a second power supply assembly while the conduction of current in other power supply assemblies are increased to compensate for the first and second power supply assemblies not conducting current for the purposes of propulsion. Thus, maintenance may occur even during operation of the vehicle. Thus, by providing such maintenance, wear is reduced, component life is increased, and overall efficiencies improved.

Additionally, the controller may vary the conduction of current of each power supply assembly to enhance overall performance of the vehicle. Specifically, by having a controller that monitors characteristics of each power supply assembly, the controller may make determinations regarding the power supplied by each power supply assembly at any given time. Thus, in an example, when a rail vehicle may be on a heavy grade section of a track where more load requirement may be detected on one traction motor than another due to weight shift, adhesion, or the like, upon detection, the controller may increase the amount of conductive current provided to a first traction motor to actuate the axle or wheel while decreasing the conductive current provided to a second traction motor. Alternatively, for other vehicles, such as off highway vehicles, the load requirement detected on one motor compared to another may differ as a result of a curved path. Specifically, a vehicle may have different motors coupled with different wheels on opposite sides of the vehicle. During movement through a curve, the current conducted to the motors along the outside of the curve may be greater than the current conducted to the motors along the inside of the curve such that the propulsive force generated by the motors along the outside of the curve is greater than the propulsive force generated by the motors along the inside of the curve. In yet another example, when a vehicle is stopped and must provide an initial load to begin propulsion, the controller may determine to provide more conduction of electric current in power assemblies to provide more torque for wheel sets in the front of the vehicle compared to the back of the vehicle. In each instance, the controller may be configured to control conduction of electric current from a battery assembly to each of the motors of the vehicle, and to direct each of the battery assemblies to concurrently supply a different amount of the electric current to corresponding motors of the vehicle based on the monitored load requirements to enhance efficiency and performance of a vehicle, or vehicle system.

Additionally, each power supply assembly may have a battery assembly with a different string configuration in order to increase performance of the electric supply system. In one example, a battery assembly may include cell technology and the capability to charge at a high rate in order to benefit a specific power supply assembly of the electric supply system. Additionally, because of the system architecture with isolated power supply assemblies, when specific battery assemblies need to be modified or updated, because of obsolescence, required upgrade, part replacement, or the like, retrofitting, repairing, or updating a new battery assembly is facilitated. In one example, each axle has a power supply assembly with a battery assembly with a different chemistry, differing charging or discharging requirements, differing make or model, differing manufacturer, voltage, capacity, thermal management system, or the like. Thus, the arrangement of the architecture improves the functionality of the electric supply system by facilitating repair, providing more modularity, increasing efficiencies, and providing control, design, operation, and maintenance flexibility.

A connection device 416 may be electrically coupled between the first bus 412A, the traction motor, and a power supply source 418, or wayside source. In one example the connection device may be a transfer switch. Alternatively or additionally, a power supply source 418 may be provided or coupled to auxiliary buses 412B-C. In this example, the power supply source may be coupled to the first bus 412A with the connection device that may be configured to couple with the power supply source 418 offboard the vehicle. The connection device may be coupled between the power supply source and the first inverter 404A. The connection device may be configured to change states between an onboard state that conductively couples the battery assemblies with the corresponding traction motor and an offboard state that conductively couples the corresponding inverter 404A with the power supply source 418. In this manner, the power supply source may be used to recharge the battery assembly. The connection device, additionally, disconnects the traction motor while the power supply source may be coupled to the inverter 404A for charging the battery assembly of a first power supply assembly, to ensure accidental movement of the vehicle during recharging may be avoided.

During braking there may be conditions under which the batteries may be not capable of absorbing all the energy provided by the traction motor. This could be due the state of charge of the batteries (example at or near full charge), performance issues with batteries, battery age, higher braking demand than battery capacity etc. under these type of conditions, dynamic brake grid assembly 424 can be electrically coupled to the plural busses 412A-C via a switch 426. Thus, when the energy provided by 406 may be more than what can be stored by, the remainder may be dissipated in the dynamic brake grid assembly as heat.

While the first inverter 404A may be coupled to the first bus 412A and traction motor, additional buses 412B-C may be utilized to couple the battery assembly to second inverter 404B and third inverter 404C respectively. In one example, the second inverter 404B couples to an auxiliary device that has an auxiliary load. The auxiliary load can include lights, air brake systems, hotel loads, air conditioning, or the like that may be critical for the operation of the vehicle. Often such auxiliary device needs to operate even when thee of the power supply assembly may be powered down. In those type of circumstances, an auxiliary inverter like inverter 404B may be used to power the auxiliary bus 412B that, in one example, may be energized from more than one power supply assembly, either permanently or selectively.

In another example, auxiliary inverter 404C may be used to power auxiliary bus 412C when power transfer has to take place from offboard the power supply assembly to the plural buses 412A-C. In one example, the battery assembly may be charged while the vehicle may be moving, such as from a catenary, third rail, another locomotive, another power source such as an auxiliary power unit (APU), or the like. In each example, the traction inverter 404A may be used to drive a traction motor while the auxiliary inverter 404C may be used to charge the battery assembly.

FIG. 5 illustrates a schematic diagram of a controller 500 for an electric supply system. In one example the controller may be the controller of the electric supply system of FIG. 4. The controller 500 includes one or more processors 502, a memory 504, one or more sensors 506, and a transceiver 508 for communication with plural buses (not shown). In one example the plural buses may be the plural busses 412A-C of FIG. 4. The controller may be electrically coupled to battery assemblies (not shown), traction motors (not shown), and/or auxiliary devices (not shown).

Specifically, the controller 500 is configured to execute a set of instructions that are stored in one or more memory 504, in order to process data. For example, the controller 500 may include or be coupled to one or more memories. The memory 504 may also store data or other information as desired or needed. The memory 504 may be in the form of an information source or a physical memory element within a processing machine.

The set of instructions may include various commands that instruct the controller 500 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

It is to be understood that the one or more processors or controller may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the controller may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a local storage medium (for example, one or more memories) for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The sensors may be speed sensors, pressure sensors, position sensors, temperature sensors, voltage sensors, current sensors, or the like. Additionally, the transceiver may be a separate receiver and transponder that transmits and receives signals to and from the controller.

Figure 6:
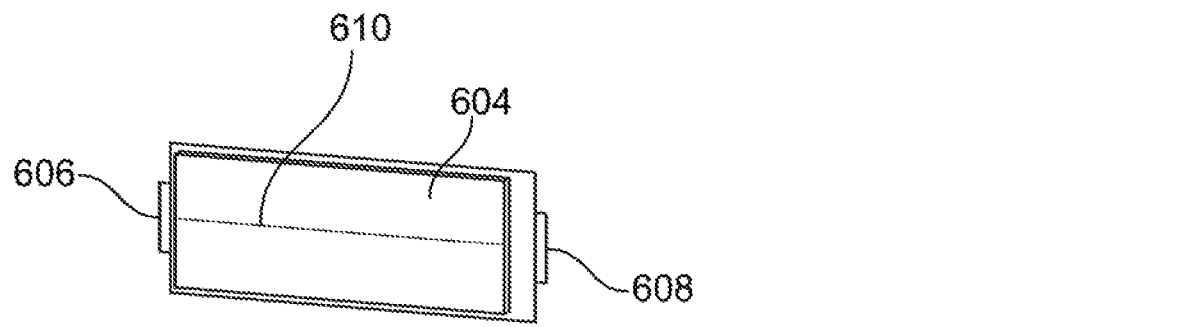
FIG. 6 may be a schematic diagram of a battery cell in accordance with one embodiment of the inventive subject matter.
Figure 7:
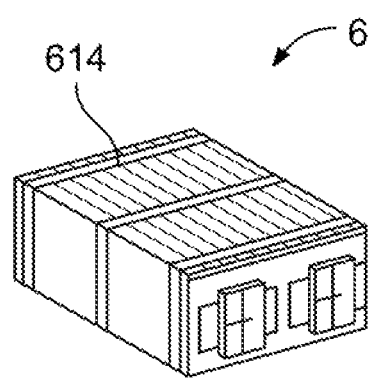
FIG. 7 may be a schematic diagram of a battery cell stack in accordance with one embodiment of the inventive subject matter.
Figure 8:
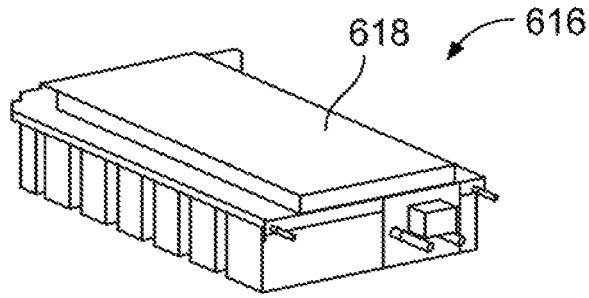
FIG. 8 may be a schematic diagram of battery module in accordance with one embodiment of the inventive subject matter.

FIGS. 6-8 illustrate a perspective views of components of battery assemblies 600, 602, while FIGS. 9-10 illustrate the example battery assemblies 600, 602. In one example the battery assembly 600 is one of the battery assemblies 302 of FIG. 3. In another example, the battery assembly 602 is one of the battery assemblies 302 of FIG. 3. In yet another example, both battery assembly 600 and 602 are battery assemblies of the battery assemblies 302 of FIG. 3.

As illustrated in FIG. 6, a battery cell 604 may be provided. In one example the battery cell 604 may be a lithium-ion battery that includes a positive electrode 606 made or formed from a metal oxide such as lithium-cobalt oxide ($LiCoO_2$), lithium iron phosphate ($LiFePO_4$), or the like. The lithium-ion battery also includes a negative electrode 608 made or formed from carbon. Optionally a lithium polymer, or lithium salt in an organic solvent may be utilized as an electrolyte 610. When charged, the positive electrode provides lithium ions through the electrolyte to the negative electrode. When discharging the lithium ions move through the electrolyte from the negative electrode to the positive electrode.

FIG. 7 illustrates a perspective view of a cell stack 612 of at least one of the battery assemblies 600 and 602. The cell stack includes a housing 614 that contains numerous battery cells stacked in side-by-side relation to one another. By stacking the battery cells, they may all be coupled to increase the output of the cell stack 612. In one example twelve (12) battery cells make up one cell stack 612. Alternatively, more or fewer cells may be included in a single cell stack. These cells may be connected in parallel and series combinations.

FIG. 8 illustrates a battery module 616 that includes a housing 618 containing multiple cell stacks 612. As a result of the increase in the amount of battery cell stacks 612, the output of the battery module is increased. In one example, three (3) cell stacks may be received, coupled, and contained within the housing of the battery module.

FIGS. 9 and 10 show example battery assemblies. In one example, the battery assembly of FIG. 9 may be the battery assembly in FIG. 4. In another example, the battery assembly of FIG. 10 may be the battery assembly in FIG. 4. The battery assembly includes a rack assembly 620 that has plural compartments 622 for receiving battery modules to form first string 624 and second string 626. In one example between twenty-four (24) and thirty-two (32) modules may be received, coupled, and contained within the rack assembly 620 to form the first and second strings. In other examples less than 24 modules are provided, while in yet other examples more than 32 modules are provided. Optionally, by combining the battery modules, each of the first string and second string can provide an output voltage less that about 1000V, in a range of from about 1000V to about 1500V, or greater than about 1500V. Similarly, in the example of FIG. 10, five (5) to thirty-two (32) modules may be electrically coupled in parallel to similarly provide a high powered or higher energy output. As with FIG. 9, in FIG. 10, a first string 624 and second string 626 may be illustrated. Such strings in one example may be connected in parallel using contactor or switch gear (not shown).

FIG. 11 illustrates a method 1100 of powering a vehicle. Suitable vehicles may include a rail vehicle, a marine vessel vehicles, mining and industrial equipment vehicles, automotive passenger vehicles, on-road vehicles including on-road trucking vehicles, aircraft including manned and unmanned aircraft and/or the like. In one example the vehicle is the vehicle system of FIG. 1.

At 1102, one or more processors direct plural traction motors of each of plural separate power supply assemblies to operate such that each of plural battery assemblies conduct electric current via plural buses of the power supply assemblies. In one example the battery assembly may be the battery assembly of FIG. 4. Optionally, the battery assembly may be one of battery assembly 600 or battery assembly 602 of FIGS. 9 and 10. In yet another example, the battery assembly may be part or a portion of a lithium-ion battery that includes battery cells that may be coupled to form battery stacks that may be coupled to form battery modules that may be coupled to form the battery assemblies. In one example the power supply may be a lithium-ion battery.

At 1104, one or more processors of a controller send a signal to the power supply assemblies resulting in the battery assemblies to separately conduct the electric current via the corresponding buses of the power supply assemblies to different traction motors of plural traction motors of the vehicle. In one example, the traction motor may be the traction motor of FIG. 4. Optionally, the one or more processors conduct the electric current to the traction motors via buses that may be connected in parallel to each other. Alternatively, the buses may be connected in series. In other examples the buses may be connected in parallel and series with one another.

At 1106, the traction motors rotate wheel sets of the vehicle that separately receive the electric current from a corresponding battery assembly via a corresponding bus. In one example the traction motors may be each coupled to an axle that couples to the wheels. Alternatively, the traction motors couple to the wheels. In one example, a first battery assembly conducts a first current of a first traction motor via a first bus, and also conducts a second different current of a second traction motor via a second bus. In another example, a first battery assembly conducts a first current of a first traction motor via a first bus, and a second battery assembly conducts a second current of the first traction motor via a second bus. By separately conducting the electric current from the battery assemblies via the corresponding buses of the power supply assemblies to different traction motors of plural traction motors of the vehicle, greater control over each power supply assembly and corresponding traction motor, resulting in increased efficiencies and reduction in power consumption. Specifically, a first battery assembly of a first power supply assembly may provide a first input to a corresponding first traction motor to rotate a first axle at a first speed, concurrently a second battery assembly of a second power supply assembly may provide a second input to a corresponding second traction motor to rotate a second axle at a second speed. Specifically, the first input and second input may be different such that the first and second axle rotate at different speeds. Specifically, the first input may be decreased as a result of an operating condition such as wheel slippage, a short in an inverter, battery efficiency, overheating motor, differing load requirements as a result of increased grade, turning of a vehicle through a curved path, or starting from a stopped position, additional operating conditions as described in further detail herein, and/or the like while the second input increases to compensate for the decrease of the first input. In another example the first power assembly may be powering both a traction motor and an auxiliary motor such that when the output of the first motor is desired to be the same as the output of the second motor, the first input may increase to compensate for the additional load resulting from the auxiliary motor to ensure the first traction motor and second traction motor provide a similar output.

At 1108, the one or more processors control conduction of the electric current to each of the traction motors from the corresponding battery assembly via the corresponding bus. Optionally, the one or more processors cause a first battery assembly of the battery assemblies to conduct a first amount of the electric current to a first traction motor of the traction motors via a first bus of the buses, and concurrently the one or more processors cause one or more second battery assemblies of the battery assemblies to conduct a different, second amount of the electric current to one or more second traction motors of the traction motors via one or more second buses of the buses while the first amount of the electric current may be conducted to the first traction motor. In addition to being able to operate each traction motor at differing outputs, the one or more processors may be also able to select the number, and which strings of a battery assembly to utilize at any given time. In one example the strings include at least the first string and second string of FIGS. 6-10.

As a result of separately conducting the electric current from the battery assemblies via the corresponding buses to different traction motors, as motors need more or less power as a result of varying loading conditions, such as when a train may be traveling along a heavy grade section of track, such power may be varied in an efficient manner. Similarly, if a decreased performance, issues with one of the traction motors occurs, the other traction motors still receive power to ensure a shut-down of an entire vehicle system does not occur as a result of issues with a single traction motor or battery assembly. Specifically, the system continues to conduct the electric current from one or more of the battery assemblies to one or more of the traction motors during non-operation of one or more other power supply assemblies of the power supply assemblies onboard the vehicle. Alternatively, a power supply assembly conducts at least some of the electric current supplied by a battery assembly to an auxiliary bus of the vehicle for powering one or more auxiliary loads of the vehicle. Thus, improved efficiency, performance and/or operation of the vehicle system may be provided.

At 1110, the one or more processors switch operation of at least one of the traction motors and at least one of the buses from conducting the electric current from at least one of the battery assemblies to receiving other electric current from a power supply source, such as a rechargeable power supply source, located offboard the vehicle. In one example the power supply source may be the power supply source of FIG. 4. Alternatively, the power supply source may be coupled to an auxiliary bus of the power supply assembly that does not contain the traction motor. In each example, the power supply source may be coupled to the power supply assembly as required for recharging the battery assembly.

Figure 12:
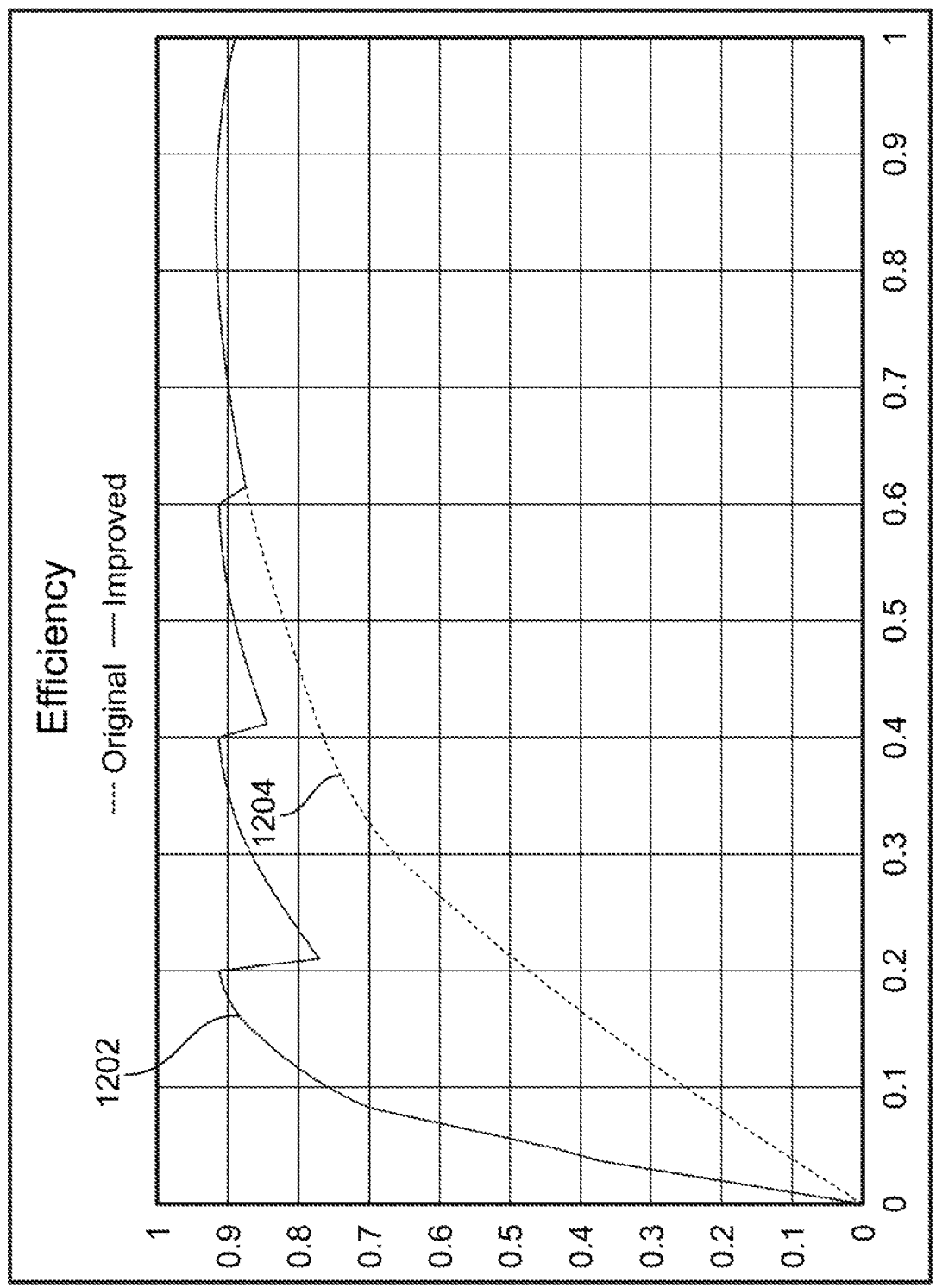
FIG. 12 may be a graph of efficiency verses power in accordance with one embodiment of the inventive subject matter.

FIG. 12 illustrates a graph of efficiency verses power of an example electric supply system having four power supply assemblies. In one example at least one of the four power supply assemblies may be the power supply assembly of FIG. 4. In another example the electric supply system may be the vehicle electric supply system of FIG. 3.

The graph of FIG. 12 illustrates a vehicle electric supply system 1202 utilizing four separate power supply assemblies with each power supply assembly including a traction motor operated in accordance to the system architecture and methodologies described herein versus a vehicle electric supply system 1204 that may be battery powered with four traction motors not utilizing the system architecture and methodologies described herein. As illustrated, 1202 shows a controller that initially operates a first power supply assembly to provide an initial range of power. As the power demand increases the efficiency of the first power supply assembly peaks and then begins to decline. At this point the controller has a second power supply assembly begin to supply power, and again, efficiency increases to a peak and then decreases. At this point the controller then actuates and adds the third power supply assembly, again resulting in a local peak efficiency before declining. Then the fourth and final power supply assembly may be activated resulting in a final peak. Meanwhile, the system 1204 that does not have the system architecture and methodology of 1202, merely slowly increases in efficiency as power increases as a result of each motor performing in unison. While systems 1202 and 1204 may be each illustrated as operating with a smooth curve in this example, in other examples, the curve may be more rigid as a result of additional factors being undertaken when determining efficiency such as ambient conditions, control functions, operating conditions like speed, power, or the like. Thus, the present architecture and methodology may improve efficiencies as illustrated by the graph.

Thus, provided may be a vehicle electric supply system for a multi-vehicle vehicle system such as a rail vehicle, off highway vehicle such as used in mining, or the like. The electric supply system provides plural power supply assemblies that do not rely on the other battery assemblies, buses, or motors. Consequently, when a decreased performance condition occurs in one power supply assembly of the electric supply system, the power supply assembly may be isolated facilitating identification, replacement, and repair. Additionally, the vehicle system may continue operation without operation of one or more power supply assemblies, resulting in reduced unsuccessful mission rate.

The electric supply system may provide the ability to have different string configurations of battery assemblies associated with each power supply assembly. This allows for portions of the system to be modified as needed when obsolescence, upgrade, part replacement, or the like occurs. Thus, each axle could have a power supply assembly and corresponding battery assembly with different chemistry, charging/discharging requirements, make/model, manufacturer, voltage, capacity, thermal management system, and the like to optimize each circuit or system individually. Furthermore, the vehicle electric supply system provides a reduced risk of strings, or sections, of batteries being at a different state of health, charge, control, and the like. The system thus allows for packaging into a building block with everything needed for a vehicle component or system, such as an axle, traction drive, cooling/heating system, or the like already incorporated. This gives manufacturing and testing flexibility.

Thus, provided in one example may be an electric supply system for a vehicle that may include two or more energy storage devices configured to store electric energy, two or more buses, each bus conductively coupling an energy storage device of the two or more energy storage devices with corresponding motors of a plurality of motors of the vehicle, and a controller configured to control conduction of electric current from each of the energy storage devices to each of the corresponding motors of the vehicle, the controller configured to direct each of the energy storage devices to concurrently vary an input to each of the corresponding motors of the vehicle.

Optionally, the energy storage devices may be battery assemblies configured to be onboard the vehicle, and the controller may be configured to vary the input between the one or more of the battery assemblies and the one or more corresponding motors in response to an operating condition of one or more other battery assemblies, one or more other buses, or one or more other motors onboard the vehicle. In one aspect, the controller may be configured to vary the input between the one or more battery assemblies and the one or more corresponding motors by varying at least one of current, pulse width, frequency, cycle rate, or voltage of the input. In another aspect, the operating condition of the one or more other battery assemblies, one or more other buses, or one or more other motors may be one of over-heating of a motor, change in torque of a motor as a result of slipping of a wheel set, change in an output of a motor as a result of shorting of an inverter coupled to the motor, efficiency of a first battery assembly compared to a second battery assembly during operation of the vehicle, change in load requirements of a motor, or change in torque requirements of a motor.

In an example, the vehicle may be one of a locomotive, a rail vehicle, a marine vehicle, a mining vehicle, an automotive passenger vehicle, an on-road trucking vehicle, a marine vessel, or an aircraft.

Optionally, the vehicle may include a connection device configured to couple an energy storage device of the two or more energy storage devices with a power supply source offboard the vehicle, and a switch coupled with at least one of the two or more buses and the connection device, the switch configured to change states between an onboard state that conductively couples a first energy storage device of the two or more energy storage devices with the corresponding motor and an offboard state that conductively couples the first energy storage device with the power supply source offboard the vehicle.

In one aspect, the plurality of motors may include a first traction motor coupled to a first wheel of the vehicle, and a second traction motor coupled to a second wheel of the vehicle. Optionally, the controller may be configured to vary conduction of electric current from a first energy storage device of the two or more energy storage devices to provide a first input from the first traction motor to the first wheel, and concurrently vary conduction of electric current from a second energy storage device of the two or more energy storage devices to provide a second input from the second traction motor to the second wheel, wherein the first input and second input are different. In another aspect, a first wheel set may be coupled to the first traction motor that includes the first wheel, and a second wheel set may be coupled to the second traction motor that includes the second wheel.

Optionally, the two or more buses include an auxiliary bus, the two or more buses being configured to conduct at least some of the electric current supplied by the two or more energy storage devices through the auxiliary bus for powering one or more auxiliary loads of the vehicle.

In one example embodiment, a vehicle electric supply system may include a plurality of power supply assemblies. Each of the power supply assemblies may include a battery assembly including rechargeable energy storage devices, an inverter coupled to the battery assembly, a motor coupled to the inverter, and a bus conductively coupled with the battery assembly and inverter. The battery assembly of each power supply assembly may be configured to power a corresponding motor of each power supply assembly with electric current supplied by the battery assembly via a corresponding bus of each power supply assembly.

Optionally, the vehicle electric supply system includes a controller coupled to each of the plurality of power supply assemblies and configured to direct each of the power supply assemblies to concurrently vary an input to each motor of each power supply assembly. In one aspect, a first power supply assembly includes a first motor, the second power supply assembly includes a second motor and the controller may be configured to direct the first power supply assembly to provide a first input to the first motor, and to direct the second power supply assembly to provide a second input to the second motor, wherein the first input is different than the second input. In another aspect, the second power supply assembly includes a third motor and the controller is configured to direct the second power supply assembly to provide a third input to the third motor.

In another aspect, buses of the power supply assemblies may be connected in parallel to each other. In yet another aspect, the bus of each of the power supply assemblies may also be conductively coupled with an auxiliary bus of the vehicle, the buses of the power supply assemblies configured to conduct at least some of the electric current supplied by the battery assemblies to the auxiliary bus for powering one or more auxiliary loads of the vehicle. Optionally, the buses of the power supply assemblies may be direct current buses.

In another example embodiment a method for powering a vehicle may include directing a battery assembly of two or more power supply assemblies to supply electric current to a different bus of two or more buses of the power supply assemblies, conducting the electric current from the battery assemblies via the corresponding buses of the power supply assemblies to a different traction motor of plural traction motors of the vehicle, and rotating wheel sets of the vehicle using the traction motors that receive the electric current from the corresponding battery assembly via the corresponding bus.

Optionally, each battery assembly may include a first string of battery cells and a second string of battery cells, and the method includes controlling conduction of the electric current from the first string of battery cells and the second string of battery cells via the corresponding bus. In another aspect, the method may include coupling at least one of the buses to a power supply source for receiving, by a battery assembly, other electric current from the power supply source located onboard the vehicle, and continuing to conduct the electric current from the battery assembly to one or more of the traction motors while the battery assembly receives electric current from the power supply source.

The foregoing description of certain embodiments of the present inventive subject matter will be better understood when read in conjunction with the appended drawings. To the extent that the figures illustrate diagrams of the functional blocks of various embodiments, the functional blocks may be not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments may be not limited to the arrangements and instrumentality shown in the drawings.

As used herein, an element or step recited in the singular and proceeded with the word "a" or "an" should be understood as not excluding plural of said elements or steps, unless such exclusion may be explicitly stated. Furthermore, references to "one embodiment" of the present inventive subject matter may be not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are not limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims may be entitled. In the appended claims, the terms "including" and "in which" may be used as the plain-English equivalents of the respective terms "comprising" and "wherein." Moreover, in the following claims, the terms "first," "second," and "third," etc. may be used merely as labels, and may be not intended to impose numerical requirements on their objects. Further, the limitations of the following claims may be not written in means-plus-function format and may be not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter may be defined by the claims, and may include other examples that occur to one of ordinary skill in the art. Such other examples may be intended to be within the scope of the claims if they have structural elements that do not differ from the literal language of the claims, or if they include equivalent structural elements with insubstantial differences from the literal languages of the claims.

The invention claimed is:

1. An electric supply system for a vehicle, the electric supply system comprising:
   a first energy storage device and a second energy storage device both configured to store electric energy;
   a first bus conductively coupling the first energy storage device to a first motor of the vehicle, and a second bus conductively coupling the second energy storage device to a second motor of the vehicle; and
   a controller configured to control conduction of electric current from the first and second energy storage devices to the first and second motors, respectively, the controller configured to direct the first and second energy storage devices to respectively concurrently vary an input to the first and second motors in response to a change in an operating condition of another energy storage device of the vehicle, including controlling the conduction of the electric current from the first energy storage device to conduct a first amount of electric current from the first energy storage device to the first motor to supply the first amount of electric current to the first motor wherein the first amount is not zero, and concurrently controlling the conduction of the second energy storage device to conduct a second amount of electric current from the second energy storage device to the second motor to supply the second amount of electric current to the second motor wherein the second amount is not zero; and wherein the first amount of electric current is different than the second amount of electric current.

2. The system of claim 1, wherein the first and second energy storage devices are battery assemblies configured to be onboard the vehicle and the operating condition is a first operating condition associated with a first group of one or more of the battery assemblies, and wherein the controller is configured to vary the input between the one or more of the battery assemblies and one or more corresponding motors of the first and second motors in response to a change in a second operating condition of a second group of one or more of the battery assemblies other than the first group of one or more battery assemblies, the controller configured to vary the input in response to a change in a third operating condition of one or more other buses or one or more motors onboard the vehicle.

3. The system of claim 2, wherein the controller is configured to vary the input between the one or more battery assemblies and the one or more corresponding motors by varying at least one of current, pulse width, frequency, cycle rate, or voltage of the input.

4. The system of claim 2, wherein the operating condition of the one or more of the battery assemblies other than the first group of the one or more battery assemblies, one or more other buses, or one or more other motors is one of over-heating of a motor, change in torque of a motor as a result of slipping of a wheel set, change in an output of a motor as a result of shorting of an inverter coupled to the motor, efficiency of a first battery assembly compared to a second battery assembly during operation of the vehicle, change in load requirements of a motor, or change in torque requirements of a motor.

5. The system of claim 1, wherein the vehicle is one of a locomotive, a rail vehicle, a marine vehicle, a mining vehicle, an automotive passenger vehicle, an on-road trucking vehicle, a marine vessel, or an aircraft.

6. The system of claim 1, further comprising:
A connection device configured to couple an energy storage device of the first and second energy storage devices with a power supply source offboard the vehicle; and
a switch coupled with at least one of the first bus or the second bus and the connection device, the switch configured to change states between an onboard state that conductively couples the first energy storage device with the corresponding motor and an offboard state that conductively couples the first energy storage device with the power supply source offboard the vehicle.

7. The system of claim 1, wherein the first and second motors include a first traction motor coupled to a first wheel of the vehicle, and a second traction motor coupled to a second wheel of the vehicle.

8. The system of claim 7, wherein the controller is configured to vary conduction of electric current from the first energy storage device of the first and second energy storage devices to provide a first input from the first traction motor to the first wheel, and concurrently vary conduction of electric current from the second energy storage device of the first and second energy storage devices to provide a second input from the second traction motor to the second wheel, wherein the first input and second input are different.

9. The system of claim 8, further comprising:
a first wheel set coupled to the first traction motor that includes the first wheel; and
a second wheel set coupled to the second traction motor that includes the second wheel.

10. The system of claim 1, further comprising an auxiliary bus, the first bus being configured to conduct at least some of the electric current supplied by the first energy storage device through the auxiliary bus for powering one or more auxiliary loads of the vehicle.

11. A vehicle electric supply system comprising:
a plurality of power supply assemblies, each of the power supply assemblies including:
a battery assembly including rechargeable energy storage devices;
an inverter coupled to the battery assembly; and
a bus conductively coupled with the battery assembly and the inverter,
the battery assembly of each of the power supply assemblies is configured to power a corresponding motor of each of the power supply assemblies with electric current supplied by the battery assembly via a corresponding bus of each of the power supply assemblies in response to an operating condition of one or more other battery assembly;
wherein a first battery assembly of the power supply assemblies in configured to power a corresponding first motor, and a second battery assembly of the power supply assemblies is configured to power a corresponding second motor; and
a controller coupled to each of the power supply assemblies and configured to direct each of the power supply assemblies to concurrently vary an input to the corresponding motor of each of the power supply assemblies; and
wherein the first battery assembly conducts a first amount of electric current from the first battery assembly to the first motor to supply the first amount of electric current to the first motor wherein the first amount is not zero, and second battery assembly conducts a second amount of electric current from the second battery assembly to the second motor to supply the second amount of electric current to the second motor wherein the second amount is not zero; and wherein the first amount of electric current is different than the second amount of electric current.

12. The vehicle electric supply system of claim 11, wherein a first power supply assembly of the power supply assemblies includes a first motor, a second power supply assembly includes a second motor, and the controller is configured to direct the first power supply assembly to provide a first input to the first motor, and to direct the second power supply assembly to provide a second input to the second motor, wherein the first input is different than the second input.

13. The vehicle electric supply system of claim 12, wherein the second power supply assembly includes a third motor, and the controller is configured to direct the second power supply assembly to provide a third input to the third motor.

14. The vehicle electric supply system of claim 11, wherein buses of the power supply assemblies are connected in parallel to each other.

15. The vehicle electric supply system of claim 14, wherein the bus of each of the power supply assemblies also is conductively coupled with an auxiliary bus of a vehicle, the buses of the power supply assemblies configured to conduct at least some of the electric current supplied by the battery assemblies to the auxiliary bus for powering one or more auxiliary loads of the vehicle.

16. The vehicle electric supply system of claim 11, wherein the buses of the power supply assemblies are direct current buses.

17. A method for powering a vehicle, the method comprising:
directing two or more battery assemblies to supply electric current to two or more buses coupled to two or more power supply assemblies, wherein each of the battery assemblies supplies electric current to a corresponding power supply assembly, and each bus of the two or more buses is coupled to the corresponding power supply assembly;

conducting the electric current from the two or more battery assemblies via the two or more buses to two or more traction motors;

varying conduction of the electric current from the two or more battery assemblies to the two or more traction motors to provide a first input from a first battery assembly of the two or more battery assemblies to a first traction motor and a second input from a second battery assembly of the two or more battery assemblies to a second traction motor in response to an operating condition of the first battery assembly, including varying the conduction from the first battery assembly to conduct a first amount of electric current to the first traction motor to supply the first amount of electric current to the first traction motor where the first amount is not zero, and varying the conduction from the second battery assembly to conduct a second amount of electric current to the second traction motor to supply the second amount of electric current to the second traction motor wherein the second amount is not zero; and wherein the conduction from the first battery assembly is different than the conduction from the second battery assembly; and rotating wheel sets of the vehicle using the traction motors that receive the electric current from the corresponding battery assembly via the corresponding bus.

18. The method of claim 17, wherein each battery assembly includes a first string of battery cells and a second string of battery cells, the method further comprising:

controlling conduction of the electric current from the first string of battery cells and the second string of battery cells via the corresponding bus.

19. The method of claim 17, further comprising:

coupling at least one of the buses to a power supply source for receiving, by the first battery assembly, other electric current from the power supply source located onboard the vehicle; and continuing to conduct the electric current from the first battery assembly to the first traction motor while the first battery assembly receives the other electric current from the power supply source.

* * * * *